United States Patent [19]

Mizuno et al.

[11] Patent Number: 4,658,150

[45] Date of Patent: Apr. 14, 1987

[54] IMPEDANCE DISCRIMINATOR RESPONSIVE TO OPERATION OF SWITCHES MOUNTED ON A STEERING WHEEL

[75] Inventors: Yoshikazu Mizuno, Aichi; Yutaka Ninoyu, Anjo; Motoyoshi Suzuki; Akira Ikuma, both of Kariya, all of Japan

[73] Assignee: Nippondenso Co., Ltd., Kariya, Japan

[21] Appl. No.: 576,899

[22] Filed: Feb. 3, 1984

[30] Foreign Application Priority Data

Feb. 4, 1983 [JP] Japan ................................. 58-17856

[51] Int. Cl.⁴ .............................................. H02J 1/00
[52] U.S. Cl. .............................. 307/10 R; 307/10 LS; 307/116; 340/825.77; 200/61.54
[58] Field of Search ................. 307/10 R, 10 LS, 115, 307/116, 130; 340/649, 661, 825.77, 825.78; 361/187-189; 200/61.54, 61.57

[56] References Cited

U.S. PATENT DOCUMENTS

| | | | |
|---|---|---|---|
| 3,455,411 | 7/1969 | Carp et al. ......................... | 180/105 |
| 4,028,620 | 6/1977 | Kitagawa et al. ............. | 307/10 R X |
| 4,118,700 | 10/1978 | Lenihan ........................... | 307/116 X |
| 4,340,824 | 7/1982 | Shaw ................................. | 307/115 |
| 4,430,576 | 2/1984 | Fowler ...................... | 340/825.77 X |
| 4,453,088 | 6/1984 | Moore ............................... | 307/10 R |

FOREIGN PATENT DOCUMENTS 0066190 12/1982 European Pat. Off. .
52-41527 10/1977 Japan .

Primary Examiner—A. D. Pellinen
Assistant Examiner—T. DeBoer
Attorney, Agent, or Firm—Cushman, Darby & Cushman

[57] ABSTRACT

Apparatus for effecting the impedance discrimination for use in an automobile comprises a plurality of switches (11-14) mounted on a steering wheel, and a plurality of first impedance elements (15-17) for providing a different impedance in response to the operation of each switch. A second impedance element (131) is coupled through a common slip-ring connection (8, 9) to the first impedance elements for feeding a current from a battery (1) to the first impedance elements (15-17) to generate a potential corresponding to the operation of one of the switches. A transistor (133) provides a horn activating signal when the potential reaches a predetermined value. A resistance network (141-144; 141-142, 150-154) derives a first value corresponding to the first potential and a second value corresponding to the battery potential. A potential discriminator (110) derives a relative value from the first and second values and detects which one of the switches is operated as a function of the relative value to generate a control signal associated with the operated switch.

7 Claims, 5 Drawing Figures

FIG. 2

|  | MODE 1 | MODE 2 | MODE 3 | MODE 4 | MODE 5 |
|---|---|---|---|---|---|
| HORN SW 11 | OFF | OFF | OFF | OFF | ON |
| SPEED SET SW 12 | OFF | OFF | OFF | ON | X |
| RESUME SW 13 | OFF | OFF | ON | X | X |
| CANCEL SW 14 | OFF | ON | X | X | X |
| IMP. (R) | $\infty$ | R15+R16+R17 | R15+R16 | R15 | 0 |
| POTENTIAL AT C | B | $\frac{R}{R+R131} \times B$ | $\frac{R}{R+R131} \times B$ | $\frac{R}{R+R131} \times B$ | 0 |
| TRANSISTOR 135. E-C | OFF | ON | ON | ON | ON |
| POTENTIAL AT A | 0 | $\frac{R138 \times B}{R138 + R136}$ | $\frac{R138 \times B}{R138 + R136}$ | $\frac{R138 \times B}{R138 + R136}$ | D134(A-K) +T133(B-E) |
| TRANSISTOR 133. E-C | OFF | OFF | OFF | OFF | ON |
| POTENTIAL AT AN1 | $\frac{R144 \times B}{R143 + R144}$ | $\frac{R144 \times B}{R143 + R144}$ | $\frac{R144 \times B}{R143 + R144}$ | $\frac{R144 \times B}{R143 + R144}$ | $\frac{R144 \times B}{R143 + R144}$ |
| POTENTIAL AT AN2 | $\frac{R142 \times C}{R141 + R142}$ | $\frac{R142 \times C}{R141 + R142}$ | $\frac{R142 \times C}{R141 + R142}$ | $\frac{R142 \times C}{R141 + R142}$ | 0 |
| HORN 6 | NOT ACTIVATED | NOT ACTIVATED | NOT ACTIVATED | NOT ACTIVATED | ACTIVATED |

IMPEDANCE DISCRIMINATOR RESPONSIVE TO OPERATION OF SWITCHES MOUNTED ON A STEERING WHEEL

BACKGROUND OF THE INVENTION

The present invention relates to an automobile switching circuit responsive to switches mounted on a steering wheel through a common conductor.

In automotive vehicles it is desired that switches for activating the horn, wipers, lights and automatic speed control apparatus and the like be mounted on the steering wheel from the standpoint of safety driving. Since the steering wheel rotates freely on a steering column, the addition of extra wires for the switches to the existing horn activating wire necessitates a substantial design changes in the current steering wheel.

However, electronic circuits mounted on a motor vehicle are subject to voltage supply variations and noise. Even under such unfavorable environments, the switched signal supplied through a common conductor must be sharply discriminated for reliable operation.

SUMMARY OF THE INVENTION

An object of the present invention is to provide an automobile switching apparatus which is immune to voltage supply variations and noise.

According to the invention, apparatus for use in an automobile for effecting the impedance discrimination comprises a plurality of switches mounted on a steering wheel, and a plurality of first impedance elements for providing a different impedance in response to the operation of each switch. A second impedance element is coupled through a common connection to the first impedance elements for feeding a current from a battery to the first impedance elements to generate a potential corresponding to the operation of one of the switches. A transistor is provided as a potential responsive means to generate a horn activating signal when the potential reaches a predetermined value. A resistance network derives a first value corresponding to the first potential and a second value corresponding to the battery potential. A potential discriminator derives a relative value from the first and second values and detects which one of the switches is operated as a function of the relative value to generate a control signal associated with the operated switch.

In a preferred embodiment, the resistance network includes a pair of first and second resistors connected in series to a junction between the first impedance elements to develop a potential representing the first value, and a pair of third and fourth resistors connected in series to the battery for developing a potential at a junction therebetween to represent the second value. The first and third resistors are of equal resistance value and the second and fourth resistors are of equal resisance value. The impedance of each of the first, second, third and fourth resistors is greater than the impedance of the second impedance element to minimize the standby current drain.

BRIEF DESCRIPTION OF THE DRAWINGS

The present invention will be described in further detail with reference to the accompanying drawings, in which:

FIG. 2 is an illustration of the various operating modes according to the present invention;

DETAILED DESCRIPTION

Figure 1:
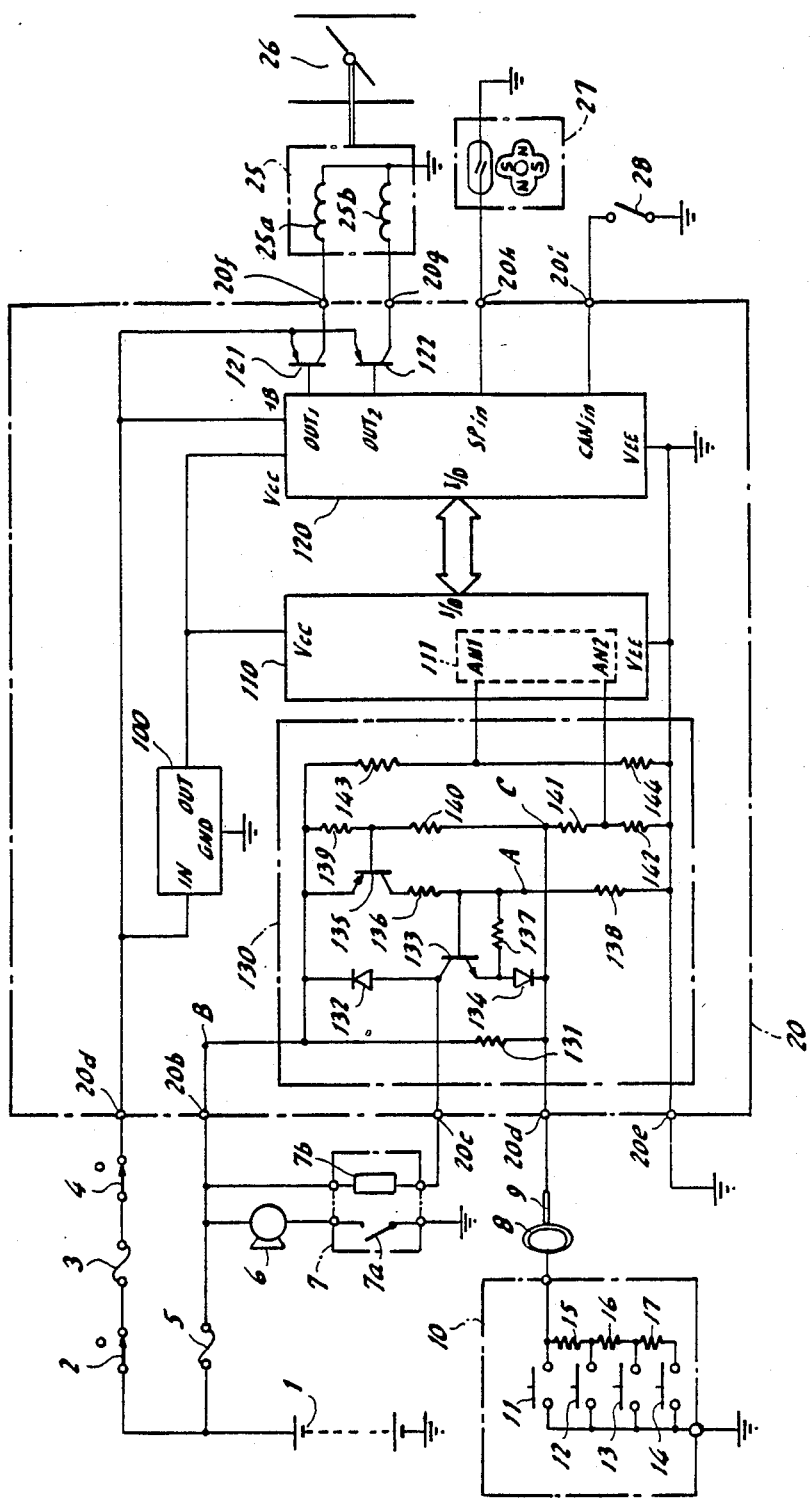
FIG. 1 is a circuit diagram of an embodiment of the present invention.

Referring to FIG. 1, a vehicle switching control circuit comprises a switch unit 10 including an array of manually operated switches 11–14 mounted on the rim of a steering wheel, and a tapped impedance circuit including series-connected resistors 15–17, or first impedance elements.

For purposes of illustration, the switches 11–14 are assigned the functions of horn activation, speed control setting, speed control resumption and speed control cancellation, respectively. The switches 11–14 are coupled together at first ends to ground through terminal 10b and at second ends to a terminal 10a through respective taps of the impedance circuit so that the horn activating switch 11 directly applies the ground potential to the terminal 10a and the other switches apply the ground potential through a different impedance value. The terminal 10a of the switch unit 10 is coupled by a common electrical circuit formed by a slip ring 8 and a contactor 9 through a terminal 20d to an impedance discriminator 20. This discriminator comprises a level shift circuit 130 which is powered by a car battery 1 through terminal 20b, a microcomputer 110 and a buffer circuit 120 which are powered by a voltage stabilizer 100 which is connected to car battery 1 through terminal 20a, automatic drive main switch 4, fuse 3 and ignition switch 2.

The level shift circuit 130 includes a resistor 131 which is connected from terminal 20b to terminal 20d. This resistor serves as a second impedance element and is connected in series with the first impedance elements 15–17 through the slip-ring and contactor for feeding current from the battery to develop a potential at terminal 20d. The resistor 131 is paralleled with a series combination of resistors 139 and 140 which is coupled at point C to a series combination of resistors 141 and 142 and thence to ground through terminal 20e. The junction between resistors 139 and 140 is connected to the base of a PNP transistor 135 which forms a series circuit with resistors 136 and 138. Potential at point A between resistors 136 and 138 is coupled to the base of an NPN transistor 133 whose emitter is connected through a diode 134 to the circuit node C and whose collector is coupled through terminal 20c and through the relay winding 7b of a horn relay 7 and fuse 5 to the battery 1. The emitter and base of transistor 133 is in shunt with a resistor 137. The relay contacts 7a are connected in series with a horn 6 between terminal 20b and ground. A surge absorbing diode 132 is connected to the collector of transistor 133.

Transistors 121 and 122 are driven by signals supplied from the buffer circuit 120 to control pressure control valves 25a and 25b of an actuator 25 that positions throttle valve 26. The duty ratio of the signals are conntrolled by the microcomputer 110 in a manner to be described. A vehicle speed sensor 27 and a brake switch 28 are also coupled to the buffer circuit 120.

The switch discrimation of the circuit 20 will be described hereinbelow with reference to FIG. 1.

When all the switches are open, transistor 135 remains off and the potential at point A is at the ground potential. When one of the switches is closed, the potential at point C is decreased by an amount proportional to the impedance value depending on which switch is operated and transistor 135 is biased into conduction. The potential at point A is made substantially equal to the potential at point B multiplied by the resistance ratio of resistor 136 to the sum of resistors 136 and 138 when any one of the switches is turned on. However, when the horn switch 11 is closed, the transistor 133 is turned on and the potential at point A becomes equal to the sum of the cathode-anode potential of the diode 134 and the emitter-base potential of transistor 133.

The circuit parameters of the level shift circuit 130 are as follows:
Resistor 131: . . . 200 ohms
Resistor 136: . . . 1.3 kiloohms
Resistor 137: . . . 1 kiloohm
Resistor 138: . . . 1.3 kiloohms
Resistor 139: . . . 27 kiloohms
Resistor 140: . . . 10 kiloohms
Resistor 141: . . . 30 kiloohms
Resistor 142: . . . 6.8 kiloohms
Resistor 143: . . . 30 kiloohms
Resistor 144: . . . 6.8 kiloohms
Diode 132: . . . 10E4
Diode 134: . . . 10E4
Transistor 133: . . . 2SD667
Transistor 135: . . . 2SA733.

More specifically, FIG. 2 indicates different modes of operation in response to the operation of each one of switches 11–14. The mark "X" indicates a condition in which the switches are either closed or open.

Mode 1 indicates a condition in which all the switches are in the turn-off state. In this case, the impedance R between the terminals 10a and 10b is infinity, and the potential at point C is approximately equal to the potential at point B since the point C is pulled up to the potential at B by resistor 131 whose resistance is lower than the sum of resistances of resistors 141 and 142. No current is drained to the base of transistor 135, so that the potential at point A is equal to the ground potential and the transistor 133 is biased nonconductive. The potential at an analog input port AN1 of the microcomputer is equal to the potential at point B divided by the resistors 143 and 144, and the potential impressed on an analog input port AN2 is equal to the potential at point C divided by the resistors 141 and 142. By establishing the following relationships between the resistors 141–144:

$$\left.\begin{array}{l} R141 = R143 \\ R142 = R144 \end{array}\right\} \quad (1)$$

and thus, $$R144/(R143+R144)=R142/(R141+R142) \quad (2)$$

the potentials at the input ports AN1 and AN2 are made equal to each other.

$$AN1/AN2 = 1 \text{ (Mode 1)} \quad (3)$$

During Mode 1 the current flows through resistors 141–144 and since these resistors have relatively high resistance values, the standby current drain of the circuit 130 is kept significantly small.

During Mode 2 in which only the cancel switch 14 is in the turn-on state, the impedance R of the switching circuit 10 is:

$$R=R15+R16+R17 \quad (4)$$

Therefore, the potential at point C is given by:

$$C = \{R/(R + R131)\} \times B \quad (5)$$
$$= \{(R15 + R16 + R17)/(R15 + R16 + R17 + R131)\} \times B$$

The transistor 135 is biased conductive by the potential at the junction between resistors 139 and 140 whose combined value of resistances is higher than the resistor 131.

The turn-on of transistor 135 causes the following potential to develop at point A:

$$A=\{R138/(R138+R136)\}\times B \quad (6)$$

By making this potential equal to the potential at point C obtained during Mode 4 which will be described later, the transistor 133 remains nonconductive. In this case, the potential at input port AN2 is as follows:

$$AN2=\{R142/(R141+R142)\}\times\{R/(R+R131)\}\times B \quad (7)$$

The ratio AN2/AN1 is thus given by:

$$AN2/AN1 = \frac{\frac{R142}{R141 + R142} \times \frac{R}{R + R131} \times B}{\frac{R144}{R143 + R144}} \quad (8)$$
$$= \frac{R}{R + R131} = \frac{R15 + R16 + R17}{R15 + R16 + R17 + R131} = L$$

During Mode 3 in which the resume switch 13 is switched on while the horn and speed control switches 11 and 12 remain off (regardless of the operating state of the cancel switch 13), the impedance R is R15+R16 and the potential at point C is given by R{(R+R131)}B, and the ratio AN2/AN1 is given by:

$$AN2/AN1=(R15+R16)/(R15+R16+R131)=M \quad (9)$$

Likewise, during Mode 4 in which the automatic speed control switch 12 is on regardless of the operating states of switches 13 and 14, the ratio AN2/AN1 is given by:

$$AN2/AN1=R15/(R15+R131)=N \quad (10)$$

During Mode 5 in which the horn switch 11 is operated, the impedance R becomes zero and the potential at point C becomes zero. The transistor 135 is biased conductive as during Modes 2, 3 and 4, and the potential at point A is determined by the resistors 136 and 138. This potential is sufficient to drive the transistor 133 into conduction and therefore the potential at point A becomes equal to the sum of the base-emitter voltage of transistor 133 and the forward voltage drop in the diode 134. The potential at analog input port AN2 is reduced to ground level.

The winding 7b of horn operating relay 7 is energized in response to the turn-on of transistor 133, closing contacts 7a to complete the horn activating circuit.

Figure 3:
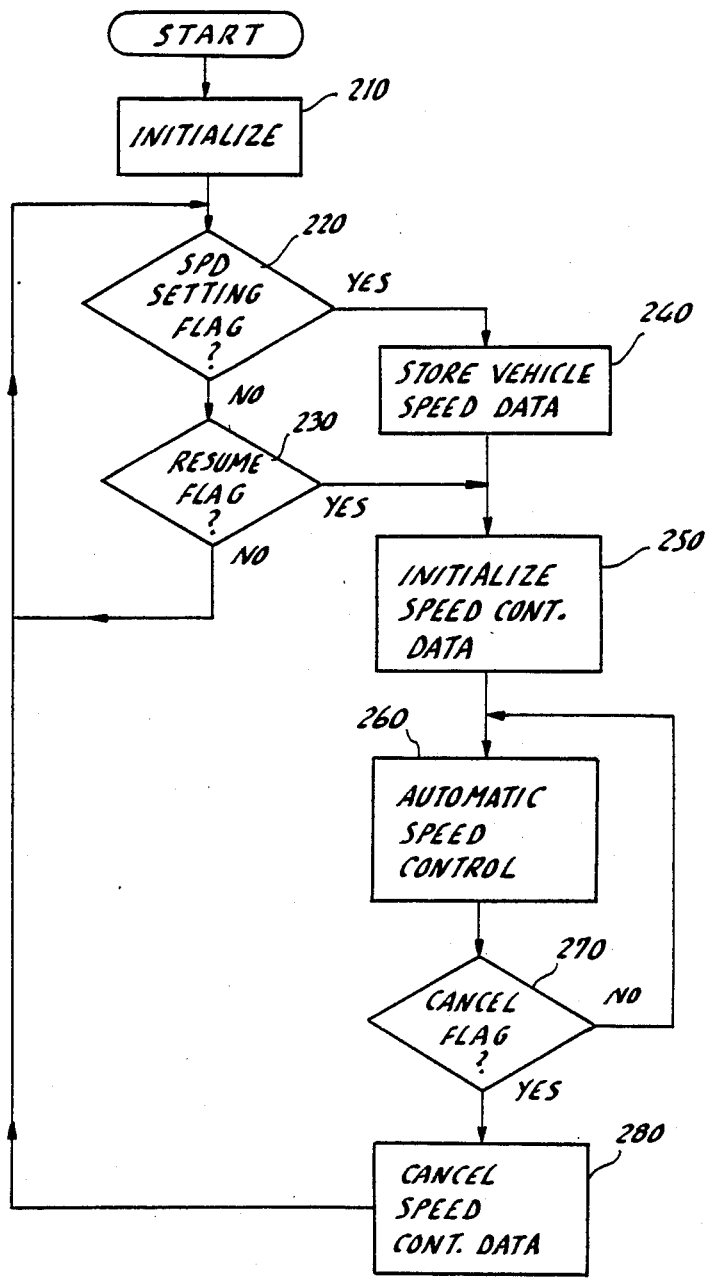
FIG. 3 is a flowchart describing the automatic speed control routine a microcomputer of FIG. 1.

The microcomputer initiates execution of instructions described in the flowchart of FIG. 3 when power is switched on. In FIG. 3, the microcomputer initializes the input/output port, RAM and flags in the initialize routine 210. At Step 220, the microcomputer checks to see if a speed setting switch turn-on flag has been established in an interrupt program to be described, and if so, control advances to a Step 240 to store the engine speed at that instant into the RAM and then goes to Step 250 to initiate engine speed control at the stored speed value. If the speed setting switch turn-on flag has not been established, control exits to Step 230 to check to see if a resume switch turn-on flag has been set up in the interrupt program, and if so, control goes to Step 250, and if not, it returns to Step 220 to repeat the Steps 220 and 230. In the Step 250, the microcomputer performs flag executions and operation of the valve 25a and the like. After execution of Step 250 control goes to Step 260 in which the valve 25b is opened by a signal whose duty ratio is controlled by a system in which proportional plus derivative control action is provided in response to the difference between the stored value of desired speed and the actual vehicle speed value which is obtained from the sensor 27 so that the actual speed approaches the desired speed.

Next, control advances to Step 270 to check the presence of a signal indicating the turn-on of the brake switch 28 or cancel switch 14, and if not, it advances to to Step 280 to cancel the stored speed value and returns to Step 220. If resume switch has been operated, control exits from Step 230 to Step 250 to control the engine speed at the value stored in the Step 240.

Figure 4:
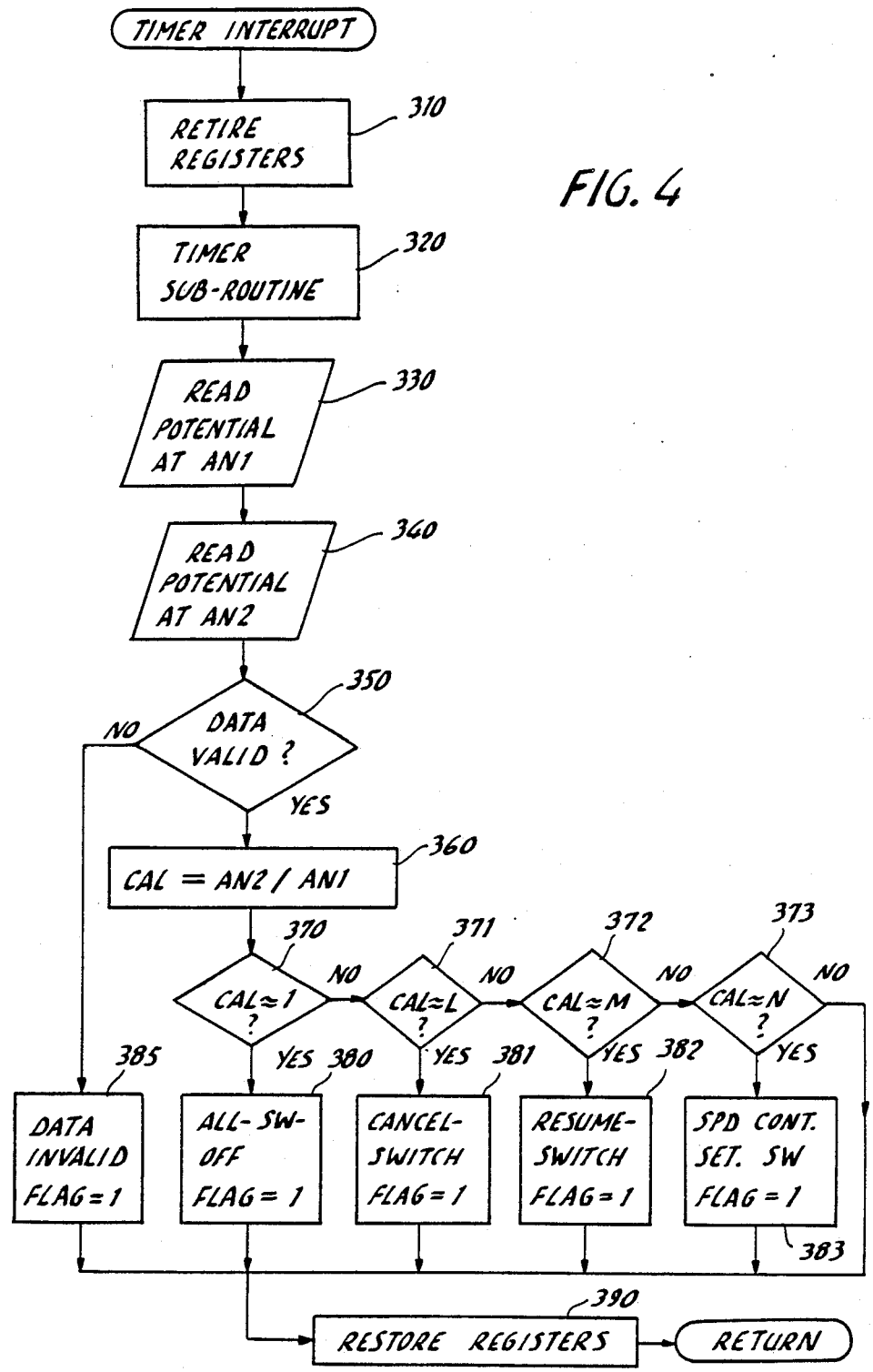
FIG. 4 is a flowchart of an interrupt program of the microcomputer.

The switch operated signals are read at 10-millisecond intervals by the timer interrupt routine shown at FIG. 4. When the internal timer of the microcomputer 110 is overflowed, an interrupt command signal is generated whereupon the timer routine is initiated. At Step 310 registers are retired, and at Step 320 timing executions that involve incrementing the software timer and so on. Control goes to Steps 330 and 331 to read the potentials at analog input ports AN1 and AN2 in succession which are developed at the instant the interrupt is made.

At Step 350, the microcomputer compares the potential values derived most recently in the Steps 330 and 340 with those derived during the previous five passes of the program to verify the validity of the data just read from the circuit 130, and if so, control goes to Step 360 and if not it exits to Step 385 wherein an invalidity flag is set up.

In the Step 360, the microcomputer derives a ratio CAL=AN2/AN1. Since reference values 1 (unity), L, M and N are derived from Equations (3), (8), (9) and (10) as described previously with respect to Modes 1, 2, 3 and 4, respectively, the value CAL matches one of these reference values.

Since the ratio so derived in Step 360 is a relative value exclusively represented by the impedance values of the resistors 15–17 and 131, voltage supply variations and noise which might have been introduced in the potentials are completely eliminated.

Steps 370 to 373 are successively performed to detect a match between the CAL value and one of the reference values, and if a match is detected in any of these Steps control goes to a corresponding one of Steps 380 to 383 to set up one of flags that represent Modes 1, 2, 3 and 4, respectively. To accommodate variations in resistances and voltage drops in various conductors employed, a certain range of tolerances is given to each of the values compared in the Steps 370 to 373. The information thus given by the operation of speed control switch 12 and resume switch 13 is referred to in the speed control main routine shown at FIG. 3. The retired registers are restored at Step 39 and control now returns to the speed control main routine.

The turn-off of ignition switch 2 cuts off power supply to microcomputer 110, buffer circuit 120 and valve operating transistors 121 and 122, and therefore automatic speed control associated with Modes 2, 3 and 4 is deactivated even though the automatic drive switch 4 remains in the on-state. On the other hand, the level shift circuit 130 is powered directly from the battery 1 and operates in Mode 5 in response to the horn switch 11 to activate the horn 6.

Figure 5:
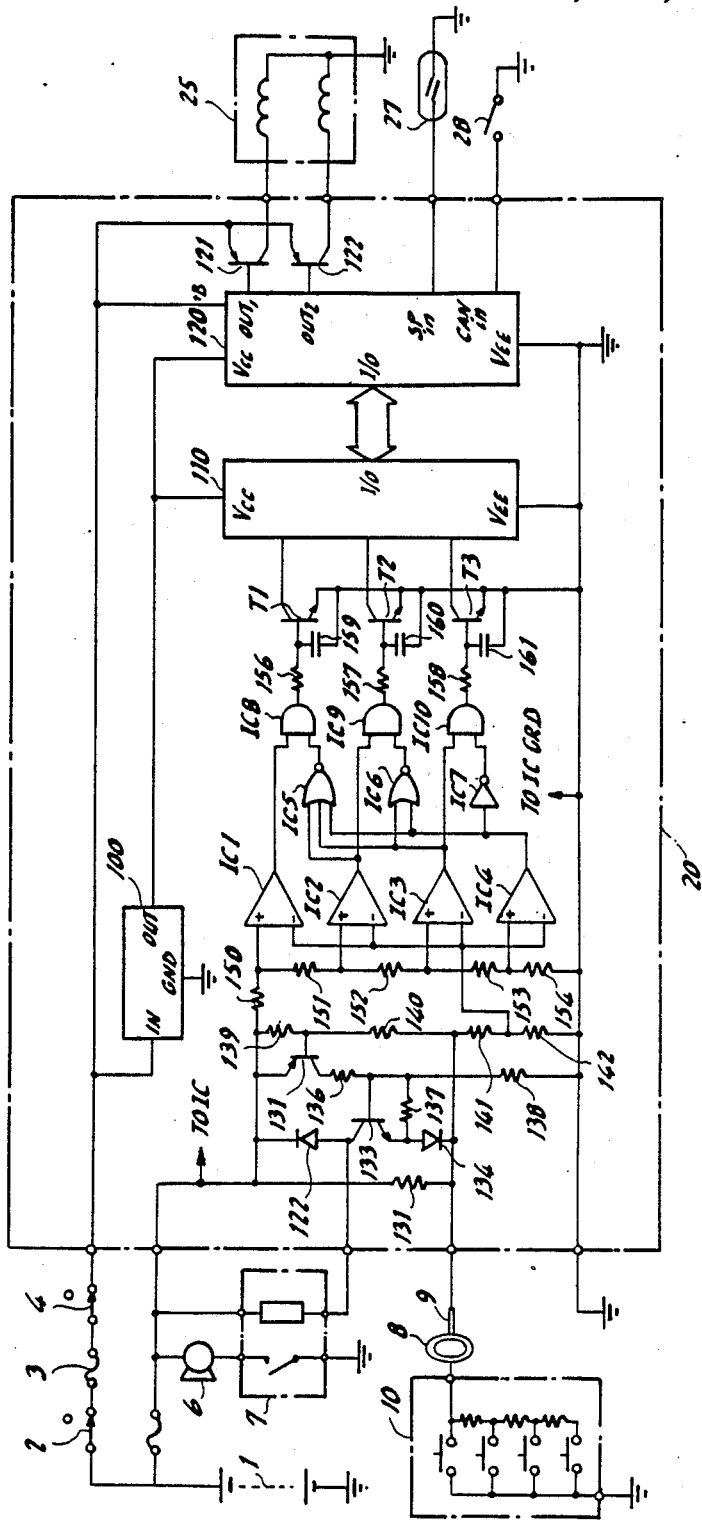
FIG. 5 is a circuit diagram of a modified embodiment of the present invention.

While mention has been made of a series of programmed instructions with which the relative value is discriminated, a discrete circuit as shown in FIG. 5 may suitably be employed instead of the flowcharts of FIGS. 3 and 4.

This impedance discriminator circuit comprises a resistance network formed by resistors 150–154 connected in series between the battery 1 to provide a plurality of reference potentials corresponding to the values obtained from Equations (3), (8), (9), and (10), respectively. Voltage comparators IC1–IC4 are provided each having an inverting input coupled to the junction between resistors 141 and 142, the noninverting inputs of the comparators IC1–IC4 being connected respectively to receive the reference potentials at junctions between successive ones of the resistors 150–154 as illustrated. Each comparator generates an output when the reference potential is reached. By the action of comparison, voltage supply variations and noise components are cancelled in each comparator.

The outputs of comparators IC1–IC4 are coupled to AND gates IC8–IC10. The AND gate IC8 receives another input signal from a NOR gate IC5 whose input terminals are coupled respectively to the outputs of the comparators IC2–IC4, the AND gate IC9 receives another input signal from a NOR gate IC6 whose input terminals are coupled respectively to the outputs of comparators IC3 and IC4, and the AND gate IC10 takes another input from a NOT gate IC7 whose input is coupled to the output of comparator IC4.

With this arrangement, the AND gates IC8–IC10 provide signals indicating the selection of Modes 2, 3 and 4. The outputs of the AND gates IC8–IC10 are coupled through resistors 156–158, respectively, to the bases of transistors T1–T3. Noise eliminating capacitors 159–160 are coupled respectively between the base and emitter electrodes of transistors T1–T4.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. Apparatus responsive to the operation of switches mounted on the steering wheel of an automotive vehicle, one of said switches being operated when a horn is activated, comprising:
    an impedance circuit having a plurality of first impedance elements connected in series between terminals of a voltage source;
    a second impedance element connected in series with said first impedance element and feeding a current from a battery mounted on said vehicle to said first impedance elements and generating a first potential corresponding to the operated switch at a junction between said first impedance elements and said second impedance element;

potential responsive means connected in parallel with said second impedance element and sensing when said first potential reaches a predetermined value and activating said horn when said predetermined value is reached;

a resistance network coupled to said junction and said battery and developing a first voltage corresponding to said first potential and a second voltage corresponding to the potential of said battery; and a resistance network comprising a pair of first and second resistors conected in series to said junction to develop said first voltage at a junction between said first and second resistors and a pair of third and forth resistors connected in series between terminals of said battery for developing said second voltage at a junction between said third and fourth resistors, said first and third resistors being equal in resistance value and said second and fourth resistors being equal in resistance value; and discriminating means connected to said resistance network and generating a control signal in accordance with the relative value of said first voltage to said second voltage.

2. Apparatus as claimed in claim 1, wherein the impedance of each of said first, second, third and fourth resistors is greater than the impedance of said second impedance element.

3. Apparatus as claimed in claim 1 wherein said discriminating means comprises a comparator having a first input terminal connected to the junction between said first and second resistors and a second input terminal connected to the junction between said third and fourth resistors for generating a comparator output as said relative value.

4. Apparatus as claimed in claim 3 wherein the potential at the junction between said third and fourth resistors represents a ratio of the impedance value of one or more of said first impedance elements to the sum of the impedance values of said one or more first impedance elements and said second impedance element.

5. Apparatus responsive to the operation of switches mounted on the steering wheel of an automotive vehicle, one of said switches being operated when a horn is activated, comprising:

an impedance circuit having a plurality of first impedance elements connected in series between terminals of a voltage source;

a second impedance element connected in series with said first impedance elements and feeding a current from a battery mounted on said vehicle to said first impedance elements and generating a first potential corresponding to the operated switch at a junction between said first impedance elements and said second impedance element;

potential responsive means connected in parallel with said second impedance element and sensing when said first potential reaches a predetermined value and activating said horn when said predetermined value is reached;

a resistance network coupled to said junction and said battery and developing a first voltage corresponding to said first potential and a second voltage corresponding to the potential of said battery; and discriminating means connected to said resistance network and generating a control signal in accordance with the relative value of said first voltage to said second voltage, wherein said discriminating means including means dividing a value corresponding to said second voltage by a value corresponding to said first voltage to derive the ratio of said first voltage to said second voltage as said relative value and detecting a match between said ratio and one of a plurality of reference values, said control signal being generated when said match is detected.

6. Apparatus as claimed in claim 5 wherein each of said reference values represents a ratio of the impedance value of one or more of said first impedance elements to the sum of the impedance values of said one or more first impedance elements and said second impedance element.

7. Apparatus as claimed in claim 5, wherein said resistance network comprises a pair of first and second resistors connected in series to said junction to develop said first voltage at a junction between said first and second resistors and a pair of third and fourth resistors connected in series between terminals of said battery for developing said second voltage at a junction between said third and fourth resistors, said first and third resistors being equal in resistance value and said second and fourth resistors being equal in resistance value.

* * * * *